United States Patent [19]

Kirkland, Jr. et al.

[11] Patent Number: 5,701,422
[45] Date of Patent: Dec. 23, 1997

[54] METHOD FOR ENSURING CYCLE ORDERING REQUIREMENTS WITHIN A HIERARCHICAL BUS SYSTEM INCLUDING SPLIT-TRANSACTION BUSES

[75] Inventors: James B. Kirkland, Jr., West Columbia, S.C.; Edward A. McDonald, Baton Rouge, La.

[73] Assignee: NCR Corporation, Dayton, Ohio

[21] Appl. No.: 573,217

[22] Filed: Dec. 13, 1995

[51] Int. Cl.⁶ .................... G06F 13/00; G06F 13/38
[52] U.S. Cl. .................. 395/309; 395/292; 395/308; 395/468
[58] Field of Search .................... 395/306-309, 395/468, 495, 290, 484, 288, 800, 292

[56] References Cited

U.S. PATENT DOCUMENTS

| | | | |
|---|---|---|---|
| 4,633,392 | 12/1986 | Vincent et al. | 364/200 |
| 4,785,394 | 11/1988 | Fischer | 364/200 |
| 4,949,239 | 8/1990 | Gillett, Jr. et al. | 364/200 |
| 4,953,072 | 8/1990 | Williams | 364/200 |
| 4,980,854 | 12/1990 | Donaldson et al. | 364/900 |
| 5,068,781 | 11/1991 | Gillett, Jr. et al. | 395/325 |
| 5,111,424 | 5/1992 | Donaldson et al. | 395/725 |
| 5,191,649 | 3/1993 | Cadambi et al. | 395/200 |
| 5,276,852 | 1/1994 | Callander et al. | 395/309 |
| 5,280,591 | 1/1994 | Garcia et al. | 395/325 |
| 5,287,477 | 2/1994 | Johnson et al. | 395/425 |
| 5,333,296 | 7/1994 | Bouchard et al. | 395/497.02 |
| 5,345,562 | 9/1994 | Chen | 395/275 |
| 5,375,215 | 12/1994 | Hanawa et al. | 395/425 |
| 5,432,918 | 7/1995 | Stamm | 395/483 |
| 5,471,638 | 11/1995 | Keeley | 395/800 |
| 5,530,933 | 6/1996 | Frink et al. | 395/468 |
| 5,535,345 | 7/1996 | Fisch et al. | 395/309 |
| 5,546,546 | 8/1996 | Bell et al. | 395/292 |
| 5,568,620 | 10/1996 | Sarangdhar et al. | 395/285 |

*Primary Examiner*—Gopal C. Ray
*Attorney, Agent, or Firm*—James M. Stover

[57] ABSTRACT

A mechanism for ensuring coherency between a system memory and a cache memory within a processing system including a first split transaction bus, the system memory being connected to the first split transaction bus; a second split transaction bus; a bus agent including the cache memory connected to the second split transaction bus, and a bus interface unit connecting the first and second split transaction busses for transferring bus cycles between the first and second split-transaction busses. The mechanism records bus cycles, such as read cycles, write cycles and cache line invalidate cycles, directed from the first split transaction bus to the second split transaction bus into a transaction queue within the bus interface unit, and sequentially transfers these cycles to the second split transaction bus in the order in which these cycles are recorded into the queue. In another embodiment of the invention, implemented in a system which utilizes a write post negation procedure for to indicate write completion, only read and invalidate cycles received from the first split transaction bus are placed within an ordering queue, while write cycles received from the first split transaction bus are immediately passed through to the second split transaction bus. However, when an invalidate cycle has been recorded to the queue, all write cycles received from the first split transaction bus are held until the queued invalidate cycle has started on the second split transaction bus.

7 Claims, 5 Drawing Sheets

| TIME | NODE BUS TRANSACTION | NODE BUS TRANSACTION |
|------|----------------------|----------------------|
| T1 | PROCESSOR 212 GAINS OWNERSHIP OF NODE BUS 230, INITIATES READ REQUEST (BRFO) LINE(X) SPLIT TRANSFER TO MEMORY INTERFACE 240 | |
| T2 | PROCESSOR 212 RELEASES OWNERSHIP OF NODE BUS 230 | |
| T3 | | MEMORY INTERFACE 240 GAINS OWNERSHIP OF SYSTEM BUS 112 TRANSMITS READ REQUEST BRFO LINE(X) SPLIT TRANSFER TO SYSTEM MEMORY 116 |
| T4 | | SYSTEM MEMORY 116 GAINS OWNERSHIP OF SYSTEM BUS 112, TRANSMITS LINE(X) READ DATA TO MEMORY INTERFACE 240, AND SENDS ACKNOWLEDGEMENT OF READ REQUEST COMPLETION |
| T5 | | SYSTEM MEMORY 116 INITIATES AN INVALIDATE CYCLE (MBE) TO LINE(X) |
| T6 | MEMORY INTERFACE 240 GAINS OWNERSHIP OF NODE BUS 230 AND TRANSMITS LINE(X) READ DATA TO PROCESSOR 212 CACHE MEMORY 222 | |
| T6 | MEMORY INTERFACE 240 TRANSMITS INVALIDATE CYCLE (MBE) TO LINE(X) TO PROCESSOR 212 AND CACHE MEMORY 222 | |

METHOD FOR ENSURING CYCLE ORDERING REQUIREMENTS WITHIN A HIERARCHICAL BUS SYSTEM INCLUDING SPLIT-TRANSACTION BUSES

The present invention relates to hierarchical computer systems and, more particularly, to a method for ordering cycles within a hierarchical bus system including multiple split-transaction buses to ensure data coherency.

BACKGROUND OF THE INVENTION

The work environment of many computer system users has become increasingly demanding; the I/O intensive, on-line, transaction-based applications and decision enabling tools employed by these users requiring more processing power than conventional system architectures can provide. Today's system users require better performance, but do not want to lose prior investments in their existing information technology solutions, or be faced with purchasing solutions which may be obsolete or lack required processing capacity as their processing needs increase. A scalable computer system architecture providing the flexibility to add additional processing capability as needs increase, while also offering backward compatibility to prior system solutions is required to satisfy the demands of these users.

Currently available tightly-coupled computer systems offer a high degree of scalability up to approximately 10 processors. Over that number of processors, however, system performance improvements gained from the addition of processors drops off. The primary deterrent to system scalability is eventual bus bottleneck and resource contention. As the number of processors and the activity level increase, the system bus becomes saturated with data traveling between processors and memory. When the system bus reaches the saturation point, adding additional processors only adds complexity to the system and does not improve overall performance. To increase the number of productive processors in a tightly-coupled, symmetrical system, resource contention must be reduced.

AT&T Global Information Solutions Co. has developed an improved scalable computer system architecture providing the flexibility to scale-up incrementally, adding processing power beyond that allowed in prior scalable system architectures while still offering backward compatibility to prior system solutions. One implementation of this architecture employing dual split-transaction system busses 112 and 114, two dual-ported system memory modules 116 and 118 connected between the two system busses, two processor boards 120 and 122 connected to system bus 112, and two processor boards 124 and 126 connected to system bus 114 is shown in FIG. 1.

Figure 1:
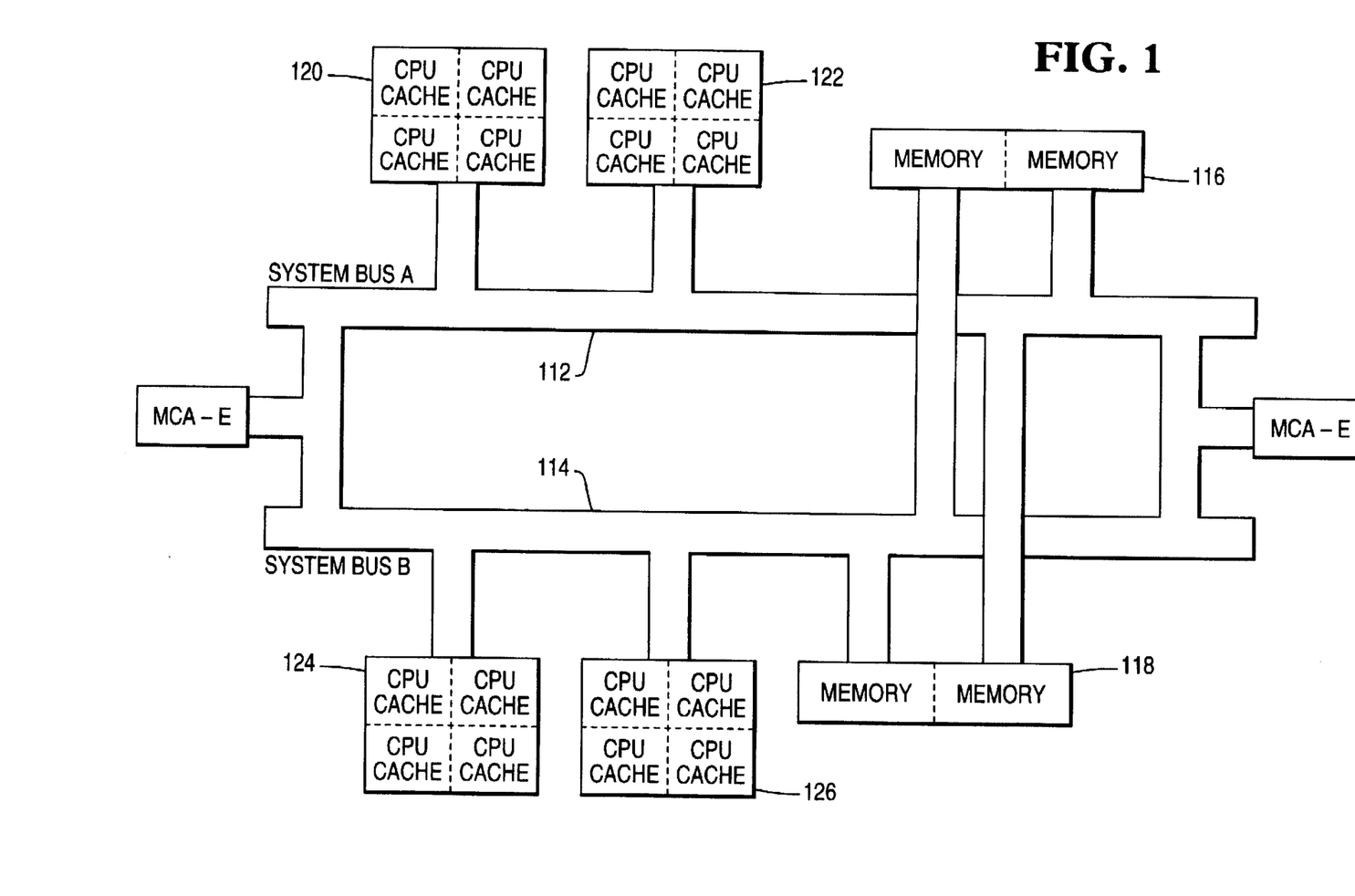
FIG. 1 is a block diagram representation of a scaleable system architecture for a computer system.
Figure 2:
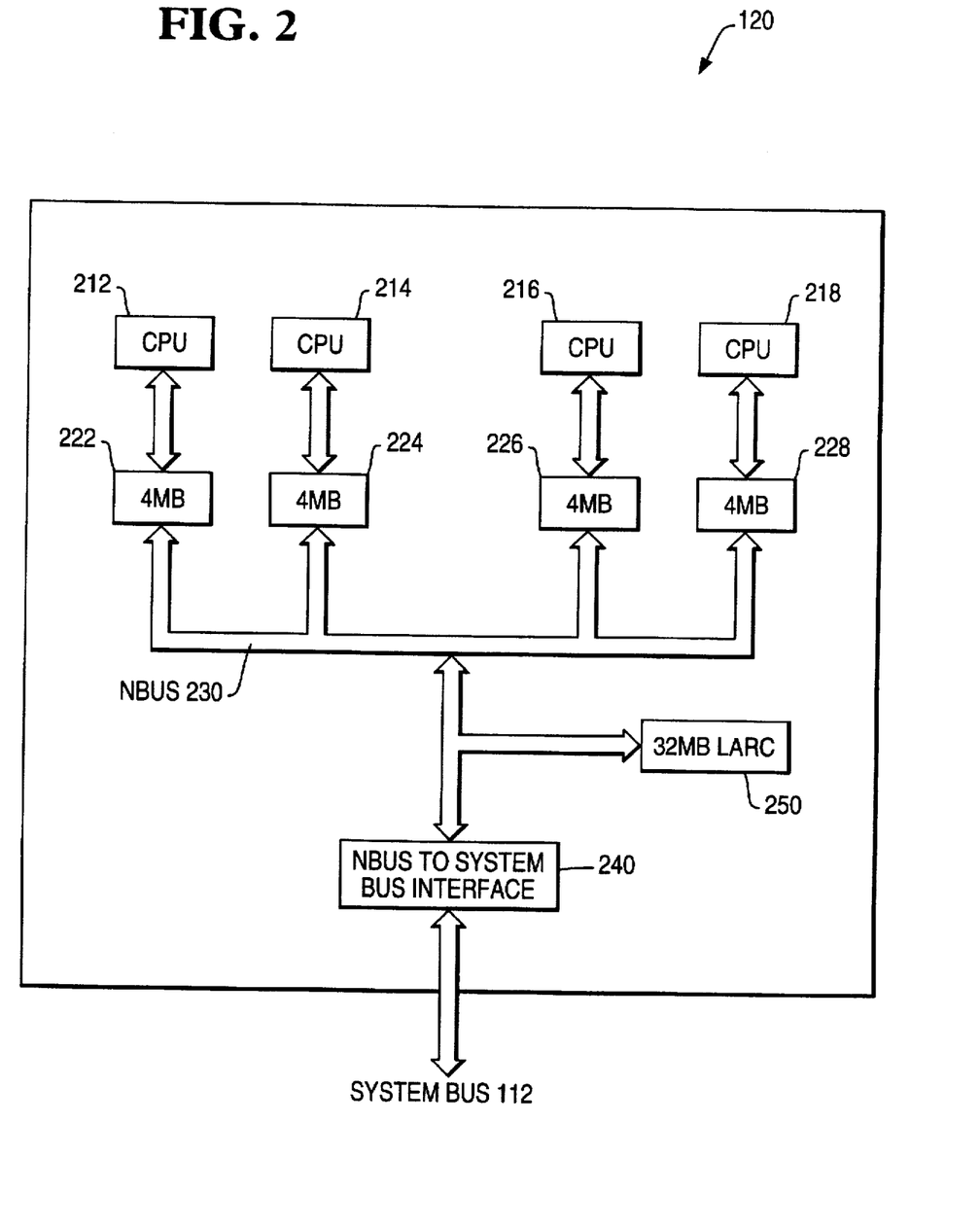
FIG. 2 is a block diagram representation of the architecture included in one of the QUAD processor boards shown in FIG. 1.

In the architecture shown in FIG. 1, each one of processor boards 120, 122, 124 and 126 contains four processors 212, 214, 216 and 218 as shown in FIG. 2. Each one of processors 212, 214, 216 and 218 includes a second level cache, identified by reference numerals 222, 224, 226 and 228, respectively. The processors and their associated second level cache memories are connected together through a disconnect or split-transaction bus 240, used exclusively for inter-processor communication. This bus is also referred to herein as a nodal-bus, or n-bus. A n-bus to system bus interface 240 interfaces n-bus 230 with one of system buses 112 or 114.

As stated above n-bus 230 and system buses 112 and 114 are split transaction buses. Unlike a traditional tenured bus system wherein the bus remains under the ownership of a requesting bus agent until the agent's request, such as a read or write request to system memory, has been completed, a split transaction bus system improves bus utilization by allowing the bus to be utilized by other bus agents while the system memory is fulfilling the request initiated the first bus agent. Following the initiation of the read or write request by the first bus agent, the first bus agent relinquishes control of the split transaction bus, thereby allowing other processors to use the bus, while waiting for a response from system memory. System memory must thereafter request control of the bus to complete the transaction by transferring or communicating, from the addressed memory, the read or write data information requested by the first bus agent.

The system shown in FIGS. 1 and 2 is known as a hierarchical system, wherein processors are grouped together into clusters or nodes at a first level, and the nodes interconnected at a second level. In a hierarchical system utilizing split transaction buses, such as node bus 230 and system busses 112 and 114, it is important that certain cycles that are propagated from one bus to another be maintained in relative order to maintain data coherency. An example of a series of events which could result in a data coherency problem is shown in FIG. 3.

Figure 3:
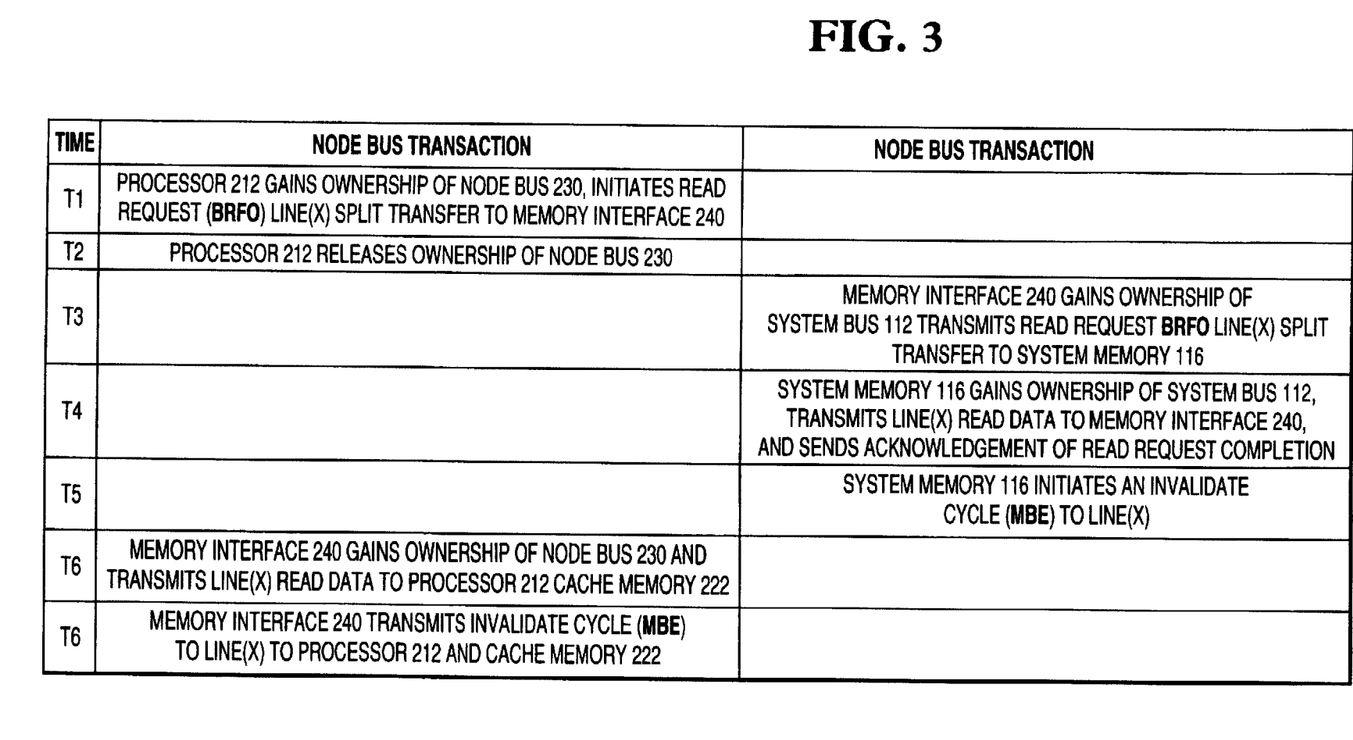
FIG. 3 is a table illustrating a sequence of events which can result in a coherency problem absent a mechanism for maintaining relative order between certain transactions within a hierarchical bus structure.

At an initial time T1 in the example shown in FIG. 3, processor 212 gains ownership of node bus 230 and initiates a read request for ownership (BRFO) of memory line(x) by transmitting the request to n-bus to system bus interface 240. Processor 212 thereafter releases ownership of node bus 230 to allow for use of the node bus by other bus agents while awaiting completion of the read request initiated by processor 212. At time T3 n-bus to system bus interface 240 gains ownership of system bus 112 and transmits the line(x) BRFO read request to system memory 116.

At a later time T4 system memory 116 gains ownership of system bus 112 to transmits line(x) read data to n-bus to system bus interface 240, and issues an acknowledgment indicating completion of the read request. Immediately following the completion of the read request at time T5, and unrelated to the read cycle, system memory 116 initiates an invalidate cycle (MBE) to line(x).

At time T6 n-bus to system bus interface 240 gains ownership of node bus 230 and transmits line(x) read data to processor 212 cache memory 222. Also during this transfer, at time T6, the invalidate cycle (MBE) to line(x) is transmitted to processor 212 and cache memory 222. However, processor 212 and cache memory 222 do not recognize that they have a copy of line(x) until the read data transfer and associated handshaking has been completed. Should the invalidate cycle be received prior to completion of the transfer and handshaking, processor 212 will ignore the invalidate cycle because it is unaware that a copy of line(x) resides in cache memory 222, and the now stale read data will be copied into cache memory.

Within a hierarchical system utilizing split-transaction buses a mechanism is required to maintain relative order between certain bus cycles to maintain cache coherency, with minimal impact on the concurrent utilization of the split-transaction busses.

OBJECTS OF THE INVENTION

It is therefore an object of the present invention to provide a new and useful method for maintaining cache coherency within a hierarchical system utilizing split-transaction buses.

It is another object of the present invention to provide such a method which maintains the relative order of certain bus cycles during transfer between split transaction busses.

3

It is yet another object of the present invention to provide such a method which maintains the concurrent use features provided by split transaction busses.

SUMMARY OF THE INVENTION

There is provided, in accordance with the present invention, a method for ensuring coherency between a system memory and a cache memory within a processing system including a first split transaction bus, the system memory being connected to the first split transaction bus; a second split transaction bus; a bus agent including the cache memory connected to the second split transaction bus, and a bus interface unit connecting the first and second split transaction busses for transferring bus cycles between the first and second split-transaction busses. The method includes the steps of recording cycles, such as read cycles, write cycles and cache line invalidate cycles, directed from the first split transaction bus to the second split transaction bus into a transaction queue within the bus interface unit, and sequentially transferring these cycles to the second split transaction bus in the order in which these cycles are recorded into the queue.

In a second embodiment of the invention, implemented in a system which utilizes a write post negation procedure for to indicate write completion, only read and invalidate cycles received from the first split transaction bus are placed within an ordering queue, while write cycles received from the first split transaction bus are immediately passed through to the second split transaction bus. However, when an invalidate cycle has been recorded to the queue, all write cycles received from the first split transaction bus are held until the queued invalidate cycle has started on the second split transaction bus.

The above and other objects, features, and advantages of the present invention will become apparent from the following description and the attached drawings.

DETAILED DESCRIPTION OF THE PREFERRED EMBODIMENT

Referring now to FIG. 1, there is seen a multi-processor system architecture employing dual split-transaction memory or system busses 112 and 114, two dual-ported system memory modules 116 and 118 connected between the two system busses, two processor boards 120 and 122 connected to system bus 112, and two processor boards 124 and 126 connected to system bus 114. In the architecture shown in FIG. 1, each one of processor boards 120, 122, 124 and 126, referred to herein as Quad boards, contains four processors 212, 214, 216 and 218 as shown in FIG. 2.

In the structure shown, processors 212, 214, 216 and 218 contained on each processor board 120, 122, 124 and 126 are Intel Pentium™ processors. A combination of innovations allows these processors to remain fully utilized and productive. Since communication between processors 212, 214, 216 and 218 is critical for data integrity, the processors on each processor board 120, 122, 124 and 126 are interconnected through a data pathway called a disconnect bus 230, used exclusively for inter-processor communication. This bus is also called a nodal-bus, or n-bus. From the perspective of the system busses 112 and 114, each Quad board resembles a single processor attached to one of the dual system buses.

In addition to an internal first level cache included within each Pentium™ processor, an external second level cache memory, shown in FIG. 2 as having a size of 4 megabytes and identified by reference numerals 222, 224, 226 and 228, is associated with each of processors 212, 214, 216 and 218, respectively.

The advantages offered by the use of cache memories to improve system speed, allowing processors to operate effectively at the faster speed of the cache memory rather than at the slower speed of a conventional DRAM main memory, are well known. A cache memory provides information to its associated processor faster than main memory, thus improving read cycles. Write cycles are also improved as a cache memory receives information from its associated processor at a fast rate, allowing the processor to continue processing while the cache independently processes the write to main memory as needed. The use of cache memories, such as second level cache memories 222, 224, 226 and 228, within a multi-processor system, however, provides additional advantages. System performance is improved through more efficient utilization of the memory or system buses. Traffic on the memory bus is reduced. Each data read and write operation need not involve main memory, rather data can be exchanged between the cache and main memory when convenient through the execution of burst cycles. The use of a line buffer to update the cache memory and the use of dual system busses further improves bus utilization.

To track the data moving between the processors and memory modules 116 and 118, the system busses 112 and 114 utilize a directory-based cache coherency scheme. A directory-base cache coherency scheme is a method of keeping track of data movements between the processors and memory. With this mainframe approach to data coherency, a memory status table identifies which processors have which lines of memory in their associated cache memories. When a processor requests data, the status table identifies the location within main memory or processor cache where the most current copy of the data resides. The advantage of this method is that no additional work must be performed until a processor needs data that resides in a cache that cannot be accessed through snooping. Directory-based cache coherency is most effective with a large number of tightly-coupled processors on a system bus.

Within each Quad board, the four processors use a bus snooping protocol on the n-bus. Bus snooping is a method of keeping track of data movements between processors and memory. There are performance advantages to this system with a small number of tightly-coupled processors. If a processor needs data that is available in the cache of another processor on the same Quad board, the data can be shared by both processors. Otherwise, the data must be retrieved from main memory, a more time consuming operation which requires system bus traffic. This method enhances system performance by reducing system bus contention.

Although bus snooping is fine on the n-bus, it can have negative consequences for system complexity and system performance as the system is scaled to include a larger number of tightly-coupled processors on a common bus.

To store heavily used sections of system memory, such as the operating system kernel and database executable files, a Limited Address Range Cache (LARC) 250 is sharable among all four processors on a Quad board. The operating system can command the LARC to map any read from designated address ranges in main system memories 116 and 118. These addresses, once fetched, are cached into LARC memory 250 and most likely do not ever need to be re-fetched from memories 116 and 118. This architecture reduces traffic on the system bus and effectively increases the system bus bandwidth.

In any system employing a cache memory, and particularly a system employing multiple cache memories and multiple levels of cache memories, data from a given memory location can reside simultaneously in main memory and in one or more cache memories. However, the data in main memory and in cache memory may not always be the same. This may occur when a microprocessor updates the data contained in its associated cache memory without updating the main memory and other cache memories, or when another bus master changes data in main memory without updating its copy in the microprocessor cache memories.

Mechanisms for maintaining data consistency between main memory and cache memories, i.e., cache coherency, are well known in the art. Although software techniques may be utilized to maintain cache coherency, solutions implemented in hardware provide a more efficient approach to maintaining cache coherency. One well known solution to the data coherency problem is the Modified-Exclusive-Shared-Invalid (MESI) cache coherency protocol. Typical implementation of the MESI hardware cache coherency protocol requires the utilization of cache controllers having the ability to:

1. use the same line size for all caches on the memory bus;
2. observe all activity on the memory bus;
3. maintain state information for every line of cache memory; and
4. take appropriate action to maintain data consistency within the cache memories and main memory.

The four states represented by MESI define whether a line is valid, if it is available in other caches, and if it has been modified. Each line of data in a cache includes an associated field which indicates whether the line of data is MODIFIED, EXCLUSIVE, SHARED, or INVALID. The four states are defined as follows for any cache:

MODIFIED—This state indicates a line of data which is exclusively available in only this cache, and is modified. Modified data has been acted upon by a processor. A Modified line can be updated locally in the cache without acquiring the shared memory bus.

EXCLUSIVE—This state indicates a line of data which is exclusively available in only this cache, and that this line is not Modified (main memory also has a valid copy). Exclusive data can not be used by any other processor until it is acted upon in some manner. Writing to an Exclusive line causes it to change to the Modified state and can be done without informing other caches, so no memory bus activity is generated. The Exclusive state is of limited use in a copyback cache that allocates on "writes". The Exclusive state is generally bypassed because the entry goes directly to the Modified state.

SHARED—This state indicates a line of data which is potentially shared with other caches (the same line may exist in one or more caches). Shared data may be shared among multiple processors and stored in multiple caches. A Shared line can be read by the CPU without a main memory access. Writing to a Shared line causes a write-through cycle.

INVALID—This state indicates a line of data is not available in the cache. Invalid data in a particular cache is not to be used for future processing, except diagnostic or similar uses. A read to this line will be a "miss" (not available). A write to this line will cause a write-through cycle to the memory bus.

In accordance with the MESI protocol, when a processor owns a line of memory, whether modified or exclusive, any writes to the owned line of memory within main memory will result in an immediate update of the same data contained within the processor's cache memory. A write to a shared line of memory within main memory will result in a coherency cycle, an invalidate, being issued to each cache memory to mark the corresponding line of data contained within the cache memory as invalid.

In the hierarchical system utilizing split transaction buses, such as node bus 230 and system busses 112 and 114 as described above, it is important that certain cycles that are propagated from one bus to another be maintained in relative order to maintain cache coherency. The present invention, which will now be described, provides a mechanism to maintain the relative order between certain bus cycles in order to maintain cache coherency.

For read cycles, ownership of a node bus is required for transferring the read data back to the requesting bus agent. For write cycles, there is no need to take up the full bus bandwidth since a simple acknowledgment of write completion is all that is required to complete the write cycle. One method for acknowledging write completion is for the n-bus to system bus interface to assert a specific "write-post" signal when a bus agent issues a write cycle on the node bus. This signal is thereafter negated when the write cycle has been completed by the system bus. In addition to read and write cycles, hierarchical bus systems including cache memories also require special memory intervention cycles to support cache coherency protocols. These cache coherency cycles, referred to herein as invalidates, also require ownership of the node bus.

The ordering mechanism of the present invention supports both systems that require node bus ownership for write completion as well as systems that utilize simple post negation for write completion.

Figure 4:
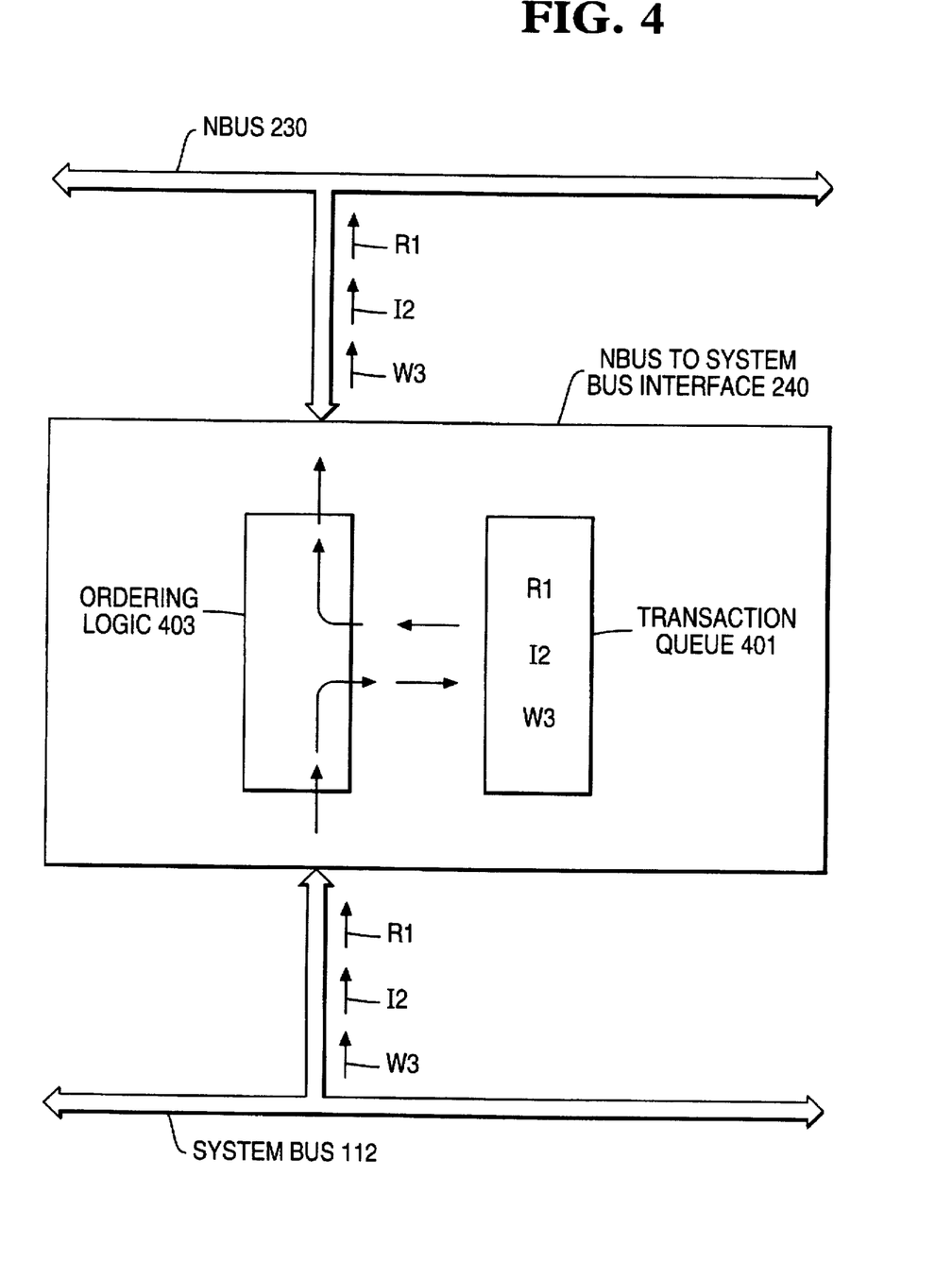
FIG. 4 is a simple block diagram illustration showing the process whereby all bus cycles being propagated from a first split transaction bus to a second split transaction bus are ordered to prevent cache coherency problems in accordance with a first embodiment of the invention.

In a system which requires node bus ownership for write completion, all cycle completions, i.e., read, write and invalidate cycles, require node bus ownership for cycle completion. Therefore, a simple ordering queue is implemented to ensure coherency. Each cycle is entered into the queue when received by n-bus to system bus interface 240. The cycles are executed in the order entered into the queue, each cycle being removed from the queue upon completion. FIG. 4 illustrates this process whereby bus cycles, identified as read cycle R1, invalidate cycle I2 and write cycle W3, which are being propagated from system bus 112 to n-bus 230 are placed into a transaction queue 401. Ordering logic 403 controls placement of the cycles into queue 401 and the sequential transference of the cycles to n-bus 230 in the order determined by queue 401.

Figure 5:
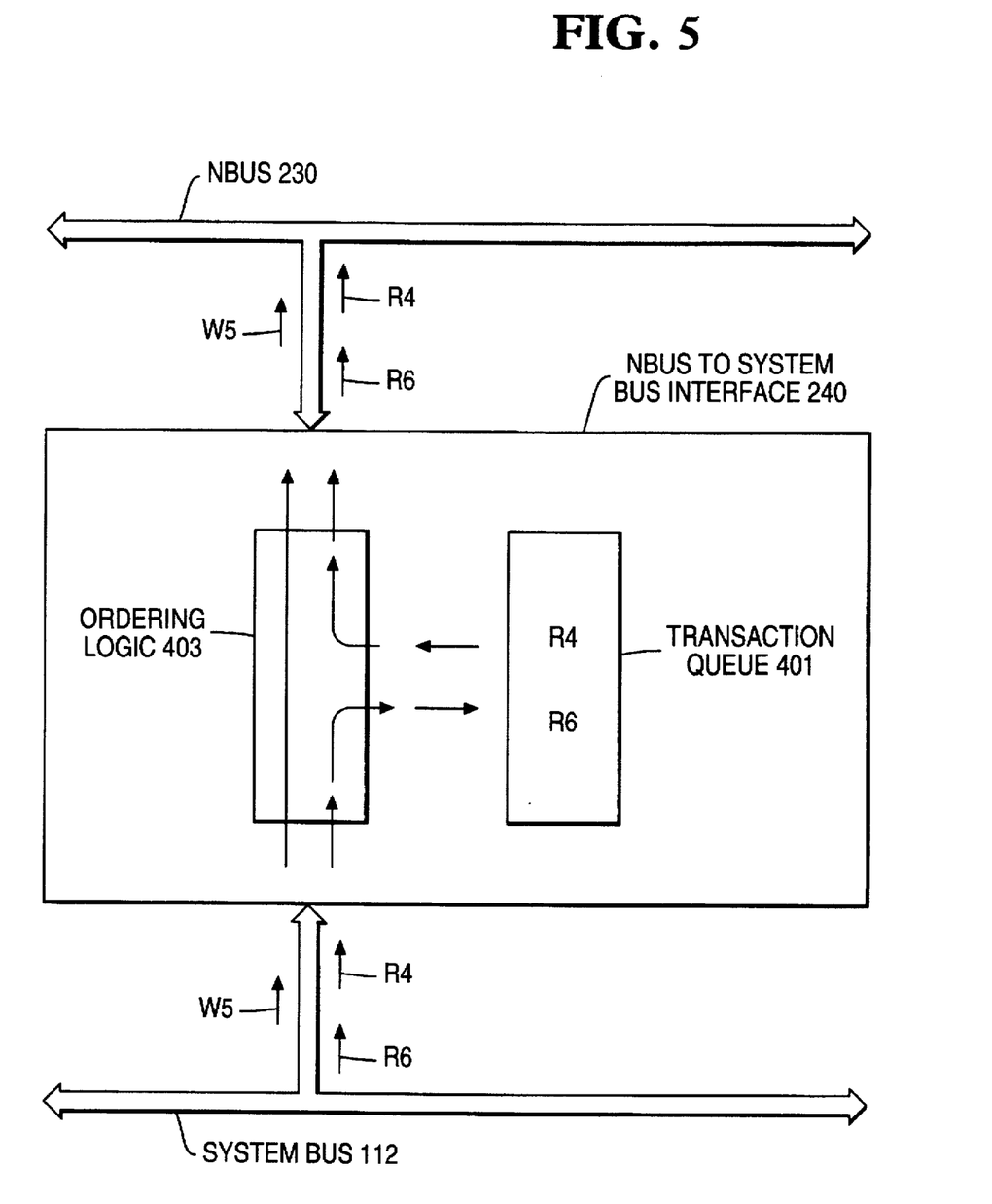
FIG. 5 is a simple block diagram illustration showing the process whereby read and cache line invalidate cycles being propagated from a first split transaction bus to a second split transaction bus are ordered to prevent cache coherency problems in accordance with a second embodiment of the invention.

In a system that utilizes simple post negation for write completion, read and invalidate cycles require node bus ownership for completion, but write cycles can be completed by simply negating the appropriate post line. The simplest method for ensuring coherency in this system would also be to utilize a simple ordering queue for all cycles, including write cycles. However, in order to lower latency and improve bus utilization it is beneficial to utilize the concurrency features provided by independent post signals. In many applications it may not be necessary for read and write cycles to be ordered with respect to each other. In such a system, only the incoming read and invalidate cycles received from the system bus are placed within an ordering queue, while write cycles received from the system bus are immediately passed through to the n-bus. FIG. 5 illustrates this process whereby read and cache line invalidate cycles being propagated from system bus 112 to n-bus 230 are ordered within the transaction queue 401. As shown in the example of FIG. 5, read cycles R4 and R6 received from the system bus are identified by the ordering logic 403 and placed into queue 401. Meanwhile, a write cycle W5 is immediately passed through to n-bus 112 and allowed to execute concurrently with other cycles placed on n-bus 230.

Although in many applications write cycles need not be written into the ordering queue, but can complete immediately after system memory negates the post signal, there may still exist a need to maintain ordering between certain write and invalidate cycles. For example, suppose an n-bus agent issues a write request to a cache line which is marked shared (S) in its cache memory. This write request propagates to the system bus as a burst write for ownership (BWFO) cycle. Also suppose that the system memory issues an invalidate cycle to the same address immediately following its conditional acceptance of the BWFO cycle. This situation may result from colliding cycles in a dual ported memory system. If the invalidate had not occurred, the n-bus agent would transition its cache line status from shared (S) to owned (either E or M) as soon as memory negates its post signal. However, the n-bus agent must invalidate (I) the line in this cache because of the invalidate cycle. If memory does not negate the post until after the invalidate cycle has started on the system bus, the n-bus to system bus interface 240 must ensure that the n-bus agent does not see its post negated until after the invalidate cycle starts on the node bus. When the n-bus agent finally detects the negation of its post, it should realize that it no longer owns a copy of the line. However, if the n-bus agent detects a post negated before the n-bus invalidate cycle occurs, there exists a time window where the n-bus agent's cache memory contains a stale copy of data. If the n-bus agent addresses this data again before the invalidate cycle invalidates the line of data in cache memory, a cache coherency failure may occur.

In summary, systems which require node bus ownership for all cycles to complete can utilize a simple ordering queue to maintain the relative order of cycles. However, if it is often not important that read and write cycles are completed in their original order, system performance can be improved by decoupling the write cycles, which do not require node bus ownership to complete, from the read cycles. In such a system, incoming read and invalidate cycles received from the system bus are ordered inside the n-bus to system bus interface 240 to ensure coherency. Incoming responses of the split transaction system bus (read cycles) and incoming coherency cycles (invalidates) are ordered with respect to each other by logic that records each request into a queue. Requests are then passed to the node bus in the order they are placed into the queue, i.e., the oldest entry in the queue will be the next issued cycle on the node bus. The queuing logic will ideally allow simultaneous entry to and deletion from the queue while maintaining the relative order of requests contained within the queue.

Normally when a post signal on the system bus is negated, the n-bus to system bus interface immediately negates the corresponding node bus post signal. However, if an invalidate cycle has been recorded to the queue, all node bus post signal activity is frozen until the invalidate cycle has started on the node bus.

It can thus be seen that there has been provided by the present invention a mechanism for maintaining cache coherency in a hierarchical system utilizing split-transaction buses. The mechanism maintains the relative order between certain bus cycles during propagation between busses to maintain cache coherency, with minimal impact on the concurrent utilization of the split-transaction busses.

Although the presently preferred embodiment of the invention has been described, it will be understood that various changes may be made within the scope of the appended claims.

What is claimed is:

1. In a processing system including a first split transaction bus, a system memory connected to said first split transaction bus, a second split transaction bus, a bus agent including a cache memory connected to said second split transaction bus, and an interface unit connecting said first and second split transaction busses for transferring bus cycles between said first and second split-transaction busses, said system employing a simple post signal negation procedure for indicating write completions, a method for ordering bus cycles directed from said first split transaction bus to said second split transaction bus, said method comprising the steps of:

recording read cycles and cache line invalidate cycles directed from said first split transaction bus to said second split transaction bus into a queue within said interface unit;

sequentially transferring said read cycles and cache line invalidate cycles to said second split transaction bus, said read cycles and cache line invalidate cycles being transferred in the order they were recorded into said queue; and transferring write completion cycles received by said interface unit from said first split transaction bus to said second split transaction bus immediately upon receipt of said write completion cycles received by said interface unit.

2. The method in accordance with claim 1, wherein:

said write completion cycles are transferred to said second split transaction bus concurrently with said read cycles and cache line invalidate cycles.

3. In a processing system including a first split transaction bus, a system memory connected to said first split transaction bus, a second split transaction bus, a bus agent including a cache memory connected to said second split transaction bus, and an interface unit connecting said first and second split transaction busses for transferring bus cycles between said first and second split-transaction busses, said system employing a simple post signal negation procedure for indicating write completions, a method for ordering bus cycles directed from said first split transaction bus to said second split transaction bus, said method comprising the steps of:

- recording read cycles and cache line invalidate cycles directed from said first split transaction bus to said second split transaction bus into a queue within said interface unit;
- sequentially transferring said read cycles and cache line invalidate cycles to said second split transaction bus, said read cycles and cache line invalidate cycles being transferred in the order they were recorded into said queue; and
- delaying the transfer of write completion cycles received by said interface unit from said first split transaction bus to said second transaction bus until all invalidate cycles recorded in said queue have been transferred to said second split transaction bus.

4. In a processing system including a first split transaction bus, a system memory connected to said first split transaction bus, a second split transaction bus, a bus agent including a cache memory connected to said second split transaction bus, and an interface unit connecting said first and second split transaction busses for transferring bus cycles between said first and second split-transaction busses, said system employing a simple post signal negation procedure for indicating write completions, the improvement comprising:

- a transaction queue within said interface unit for recording read cycles and cache line invalidate cycles directed from said first split transaction bus to said second split transaction bus; and
- means for sequentially transferring said read cycles and cache line invalidate cycles to said second split transaction bus, said read cycles and cache line invalidate cycles being transferred in the order they were recorded into said queue; and
- means for transferring write completion cycles received by said interface unit from said first split transaction bus to said second split transaction bus immediately upon receipt of said write completion cycles received by said interface unit.

5. The improvement in accordance with claim 4, wherein:

said write completion cycles are transferred to said second split transaction bus concurrently with said read cycles and cache line invalidate cycles.

6. In a processing system including a first split transaction bus, a system memory connected to said first split transaction bus, a second split transaction bus, a bus agent including a cache memory connected to said second split transaction bus, and an interface unit connecting said first and second split transaction busses for transferring bus cycles between said first and second split-transaction busses, said system employing a simple post signal negation procedure for indicating write completions, the improvement comprising:

- a transaction queue within said interface unit for recording read cycles and cache line invalidate cycles directed from said first split transaction bus to said second split transaction bus;
- means for sequentially transferring said read cycles and cache line invalidate cycles to said second split transaction bus, said read cycles and cache line invalidate cycles being transferred in the order they were recorded into said queue; and
- means for delaying the transfer of write completion cycles received by said interface unit from said first split transaction bus to said second transaction bus until all invalidate cycles recorded in said queue have been transferred to said second split transaction bus.

7. A hierarchical computer system, comprising:

- a first split transaction bus;
- a system memory connected to said first split transaction bus;
- a second split transaction bus;
- a bus agent including a cache memory connected to said second split transaction bus;
- an interface unit connecting said first and second split transaction busses for transferring bus cycles between said first and second split-transaction busses, said bus cycles including read cycles, invalidate cycles and write completion cycles, each one of said write completion cycles comprising the negation of a write post signal placed on said first and second split transaction busses;
- a transaction queue within said interface unit for recording said read cycles and said invalidate cycles directed from said first split transaction bus to said second split transaction bus; and
- means within said interface unit for sequentially transferring said cycles to said second split transaction bus, said read cycles and cache line invalidate cycles being transferred in the order they were recorded into said queue; and
- means for delaying the transfer of write completion cycles received by said interface unit from said first split transaction bus to said second transaction bus until all invalidate cycles recorded in said queue have been transferred to said second split transaction bus.

* * * * *